United States Patent
Tu et al.

(10) Patent No.: US 7,339,761 B1
(45) Date of Patent: Mar. 4, 2008

(54) METHOD FOR WEDGE TIME SHIFT CALIBRATION IN A DISK DRIVE

(75) Inventors: Kuang-Yang Tu, Irvine, CA (US); John Yin Kwong Li, Laguna Niguel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 9 days.

(21) Appl. No.: 11/406,090

(22) Filed: Apr. 18, 2006

(51) Int. Cl.
  *G11B 5/596* (2006.01)
  *G11B 5/09* (2006.01)

(52) U.S. Cl. ............................. 360/77.08; 360/78.04; 360/48

(58) Field of Classification Search ............ None
See application file for complete search history.

(56) References Cited

U.S. PATENT DOCUMENTS

| | | | |
|---|---|---|---|
| 5,038,232 | A | 8/1991 | Grace |
| 5,218,491 | A | 6/1993 | Nishida et al. |
| 6,021,012 | A | 2/2000 | Bang |
| 6,067,202 | A | 5/2000 | Rowan et al. |
| 6,094,020 | A | 7/2000 | Goretzki et al. |
| 6,175,458 | B1 | 1/2001 | Carlson |
| 6,710,957 | B2 | 3/2004 | Nakasato |
| 6,754,025 | B1 | 6/2004 | Shepherd et al. |
| 6,839,194 | B2 * | 1/2005 | Koyanagi ............... 360/51 |
| 6,914,740 | B1 | 7/2005 | Tu et al. |
| 6,954,324 | B1 | 10/2005 | Tu et al. |
| 7,133,243 | B2 * | 11/2006 | Hirano et al. ............ 360/77.04 |
| 7,212,374 | B1 * | 5/2007 | Wang et al. ............. 360/78.14 |
| 2004/0245950 | A1 | 12/2004 | Ang et al. |

FOREIGN PATENT DOCUMENTS

JP  2-73568  * 3/1990

* cited by examiner

*Primary Examiner*—Andrew L. Sniezek
(74) *Attorney, Agent, or Firm*—Robroy R. Fawcett, Esq.

(57) ABSTRACT

A method is disclosed for identifying wedge time shift zones on a magnetic disk of a disk drive. The disk drive further includes a spindle motor for rotating the disk at an operating speed in response to a spindle control current generated by a spindle control system, and a head that is actuated over the disk. During operation, the control systems causes a seek of the head across the disk and measures wedge-to-wedge times between servo wedges. The control system then calculates a wedge-to-wedge time shift value using the wedge-to-wedge times and determines whether the wedge-to-wedge time shift time value exceeds a predetermined threshold. If the wedge-to-wedge time shift value exceeds the predetermined threshold, then the control system identifies a wedge time shift zone, and stores information for compensating for the identified wedge time shift zone during disk operations.

12 Claims, 5 Drawing Sheets

| WWTShiftCyl | ACCW2WTime | |
|---|---|---|
| 400 | 0 | Shifting Zone # 1 |
| 401 | 6 | |
| 21255 | 6 | Shifting Zone # 2 |
| 21931 | 16 | |
| 22601 | 23 | |
| 23274 | 27 | |
| 26650 | 27 | Shifting Zone # 3 |
| 27323 | 36 | |
| 27996 | 39 | |
| 48455 | 39 | Shifting Zone # 4 |
| 48963 | 45 | |

METHOD FOR WEDGE TIME SHIFT CALIBRATION IN A DISK DRIVE

BACKGROUND OF THE INVENTION

1. Field of the Invention

The present invention relates to disk drives, and more particularly, to wedge time shift calibration in a disk drive for improved disk rotation rate regulation.

2. Description of the Prior Art and Related Information

In order to remain competitive, disk drive manufacturers must continually provide increased data storage capacity and access rate while rigidly controlling disk drive manufacturing cost. One key to increased data access rate is increased disk rotation rate. The disk is rotated at a constant angular velocity by a spindle motor in response to a spindle control current. The spindle motor current may be generated based on a measured time between servo wedges on the disk. However, measuring the time between servo wedges may be problematic during a high-speed seek.

Accordingly, there exists a need for a calibration technique that allows for improved regulation of a disk's rotation rate during a high-speed seek.

SUMMARY OF THE INVENTION

The present invention may be embodied in a method for wedge time shift calibration in a disk drive. The disk drive includes a disk, a head actuated over the disk, and a spindle motor. The spindle motor rotates the disk at an operating speed in response to a spindle control current generated by a spindle control system. The disk has a plurality of spaced-apart embedded servo wedges that define a plurality of concentric data tracks. In the method, wedge-to-wedge times between servo wedges are measured during a seek across the disk. A wedge-to-wedge time shift value is calculated using the wedge-to-wedge times. If the wedge-to-wedge time shift value exceeds a predetermined threshold, then a wedge time shift zone is identified, and information is stored for compensating for the identified wedge time shift zone during disk operations.

In more detailed features of the invention, the identified wedge time shift zone may include a zone start cylinder and a zone end cylinder. The information storing step may include storing the wedge-to-wedge time shift value corresponding to the zone start cylinder and the wedge-to-wedge time shift value corresponding to the zone end cylinder in nonvolatile memory. The method may further include continuing the seek from an outer diameter to an inner diameter of the disk, or from an inner diameter to an outer diameter of the disk, and, for each identified wedge time shift zone, storing information for compensating for each identified wedge time shift zone during disk operations.

The present invention also may be embodied in a disk drive including a magnetic disk, a spindle motor, a head, and a control system. The magnetic disk has a plurality of spaced-apart embedded servo wedges that define a plurality of concentric data tracks. The spindle motor rotates the disk at an operating speed in response to a spindle control current generated by a spindle control system. The head is actuated over the disk. The control systems measures wedge-to-wedge times between servo wedges during a seek of the head across the disk. The control system calculates a wedge-to-wedge time shift value using the wedge-to-wedge times and determines whether the wedge-to-wedge time shift time value exceeds a predetermined threshold. If the wedge-to-wedge time shift value exceeds the predetermined threshold, then the control system identifies a wedge time shift zone and stores information for compensating for the identified wedge time shift zone during disk operations.

In another embodiment of the present invention, the information for compensating for a wedge time shift zone is stored on the magnetic disk of the disk drive.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
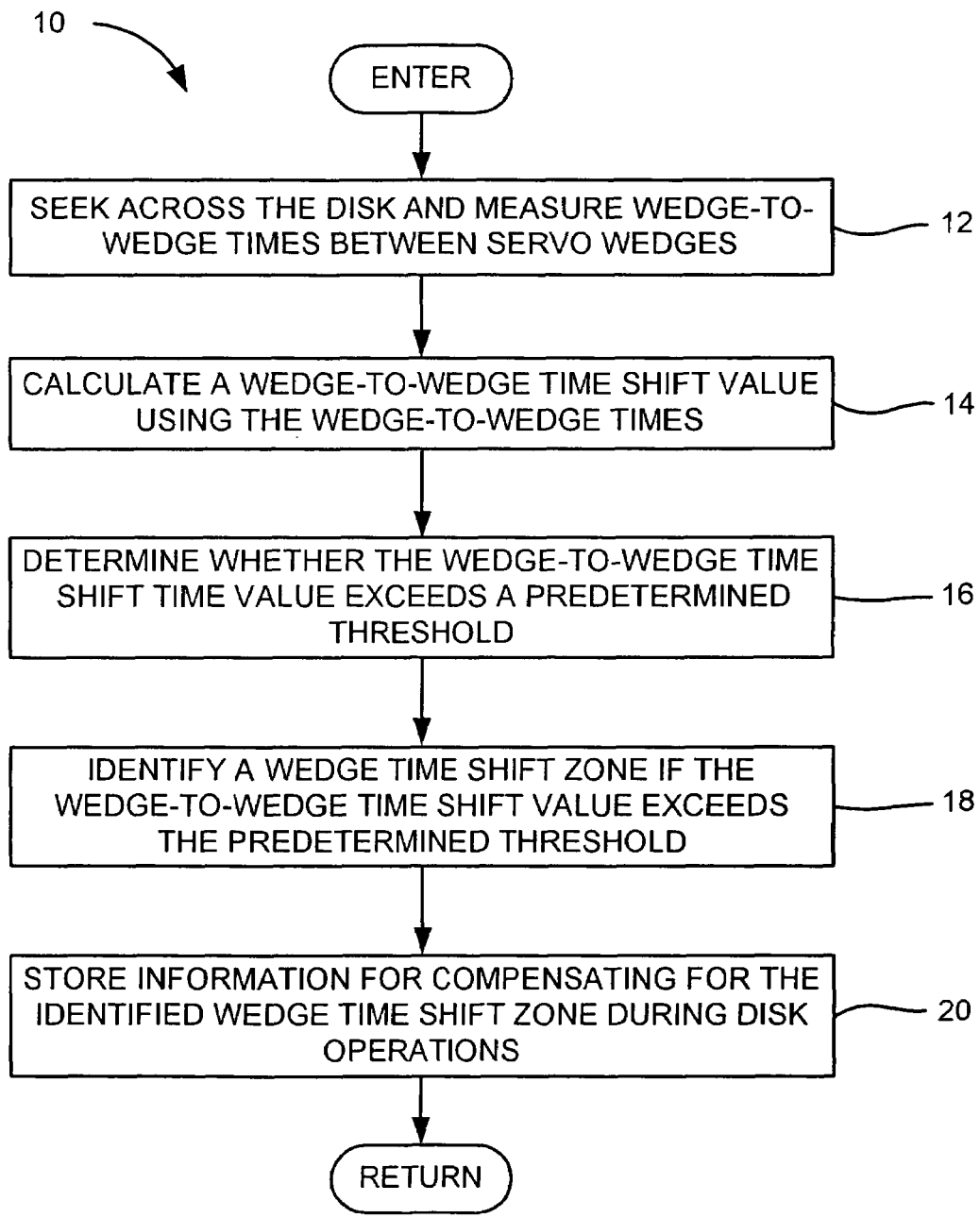
FIG. 1 is a flow diagram illustrating an embodiment of a method for wedge time shift calibration in a disk drive, according to the present invention.
Figure 2:
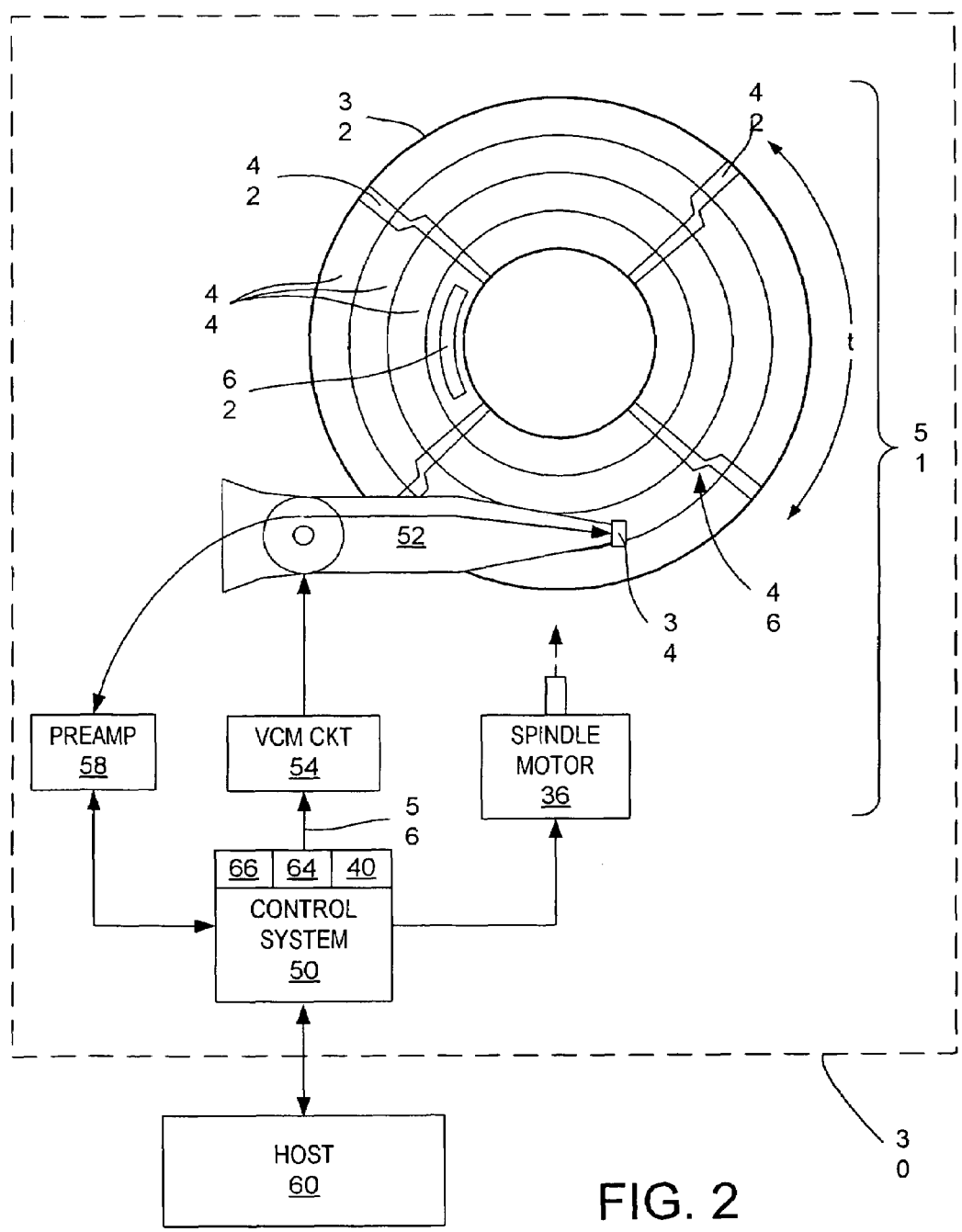
FIG. 2 is a block diagram of a disk drive having wedge time shift calibration, according to the present invention.

With reference to FIGS. 1 and 2, the present invention may be embodied in a method 10 (FIG. 1) for wedge time shift calibration in a disk drive 30 (FIG. 2). The disk drive includes a disk 32, a head 34 actuated over the disk, and a spindle motor 36. The spindle motor rotates the disk at an operating speed in response to a spindle control current generated by a spindle control system 40. The disk has a plurality of spaced-apart embedded servo wedges 42 that define a plurality of concentric data tracks 44. In the method, wedge-to-wedge times t between servo wedges are measured during a seek across the disk (step 12). A wedge-to-wedge time shift value is calculated using the wedge-to-wedge times (step 14). If the wedge-to-wedge time shift value exceeds a predetermined threshold (step 16), then a wedge time shift zone 46 is identified (step 18), and information is stored for compensating for the identified wedge time shift zone during disk operations (step 20).

The method 10 may further include continuing the seek from an outer diameter OD to an inner diameter ID of the disk 32, or from an inner diameter ID to an outer diameter OD of the disk. For each identified wedge time shift zone 46, information may be stored for compensating for each identified wedge time shift zone during disk operations.

A wedge time shift zone 46 may be caused by head slip or a bad servo write. During a high speed seek, the wedge time shift zones may cause undesirable variations in the disk rotation rate. An affected disk drive 30 may be pulled from the manufacturing process for a fatal servo error or insufficient disk rotation rate regulation caused by the wedge time shift zones. The wedge time shift calibration of the present invention allows improved disk drive manufacturing yields.

Figure 3:
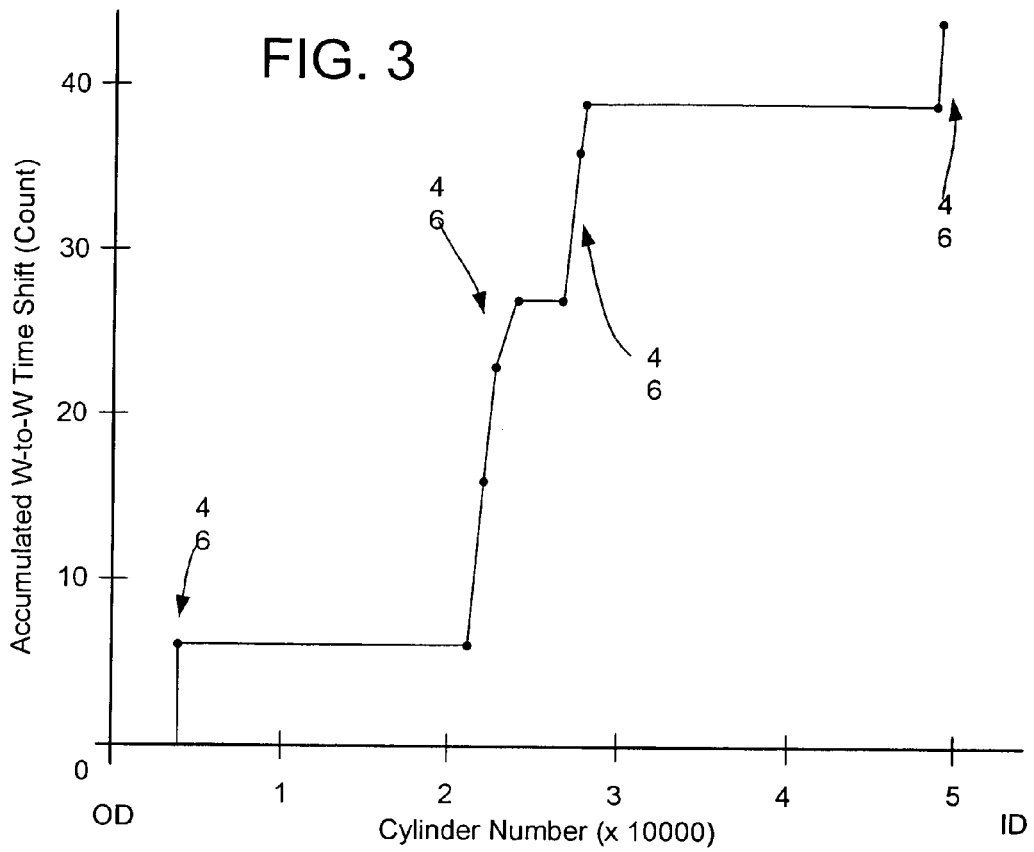
FIG. 3 is a first graph and accompanying table of accumulated wedge-to-wedge time shift versus cylinder number for identifying wedge time shift zones, according to the present invention.
Figure 4:
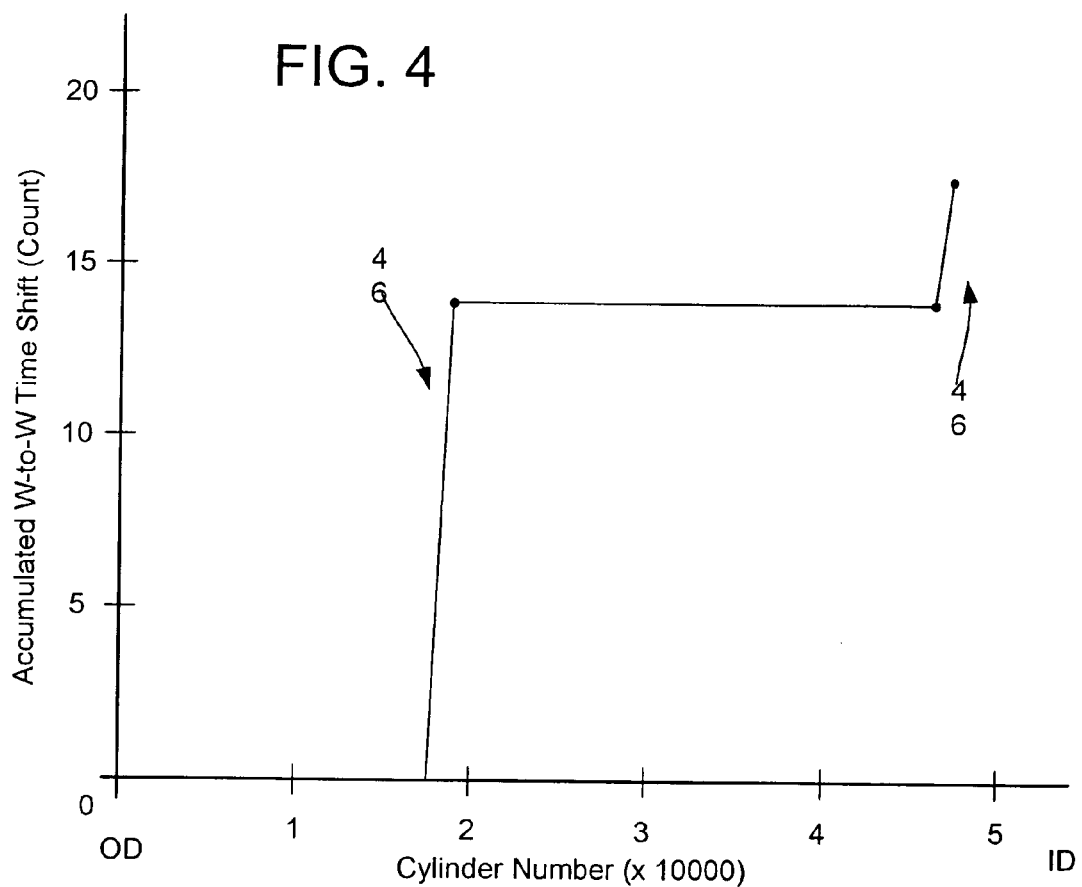
FIG. 4 is a first graph and accompanying table of accumulated wedge-to-wedge time shift versus cylinder number for identifying wedge time shift zones, according to the present invention.

With reference to FIGS. 3 and 4, each identified wedge time shift zone 46 may include a zone start cylinder and a zone end cylinder. In FIG. 3, four wedge time shift zones are identified. The first shift zone is between disk cylinders 400 (the zone start cylinder) and 401 (the zone end cylinder).

Similarly, the second shift zone is between cylinders 21255 (the zone start cylinder) and 23374 (the zone end cylinder). Likewise, in FIG. 4, two wedge time shift zones 46 are identified.

With reference again to FIG. 1, the disk drive 30 generally comprises a disk control system 50 and a head disk assembly (HDA) 51. The disk control system includes the spindle control system 40. During operation, the spindle control system regulates the disk's rotation rate by updating the spindle control current in respond to a wedge speed error determined based on the wedge to wedge time t between the servo wedges 42. The HDA includes the magnetic disk 32 having the plurality of concentric data tracks 44 recorded thereon, the head or transducer 34 for writing user data to or reading user data from a selected one of the data tracks in response to a host command, and an actuator 52 for positioning the transducer over the selected track. Because several disks may be stacked on a spindle, the tracks 44 may be referred to as cylinders and may be referenced by a cylinder number. The transducer 34 in present disk drives comprises a giant magneto-resistive (GMR) read element and thin film inductive write element. The actuator is typically implemented as a voice coil motor (VCM) circuit 54 which rotates an actuator arm about a pivot in order to position the head radially over the disk in response to control signals 56 from the disk control system. The HDA 51 also includes a preamplifier 58, and the spindle motor 36 for rotating the disk. The head communicates with the disk control system 50 via the preamplifier. The disk control system includes a servo control system that controls the transducer head's position over the disk 32. The servo control system reads track identification information and track position information from a servo sector 42 and uses that information to generate the control signals 52. The disk control system 50 also includes circuitry and processors that provide an intelligent disk control system interface between a host 60 and the HDA for execution of read and write commands. The disk control system may have, for example, an internal microprocessor 64 and nonvolatile memory 66. Program code for implementing the techniques of the invention may be stored in the nonvolatile memory and transferred to volatile random access memory (RAM) for execution by the microprocessor. The microprocessor and supporting hardware of the disk drive comprise the means for implementing the functions of the disk drive of the present invention.

The information for compensating from a wedge time shift zone 46 may be stored on the magnetic disk 32 in reserve sectors 62. Alternatively, the information may be stored in the nonvolatile memory 66. The information may include, for each wedge time shift zone, a zone start cylinder number and corresponding wedge-to-wedge time shift value, and a zone end cylinder number and corresponding wedge-to-wedge time shift value.

Figure 5:
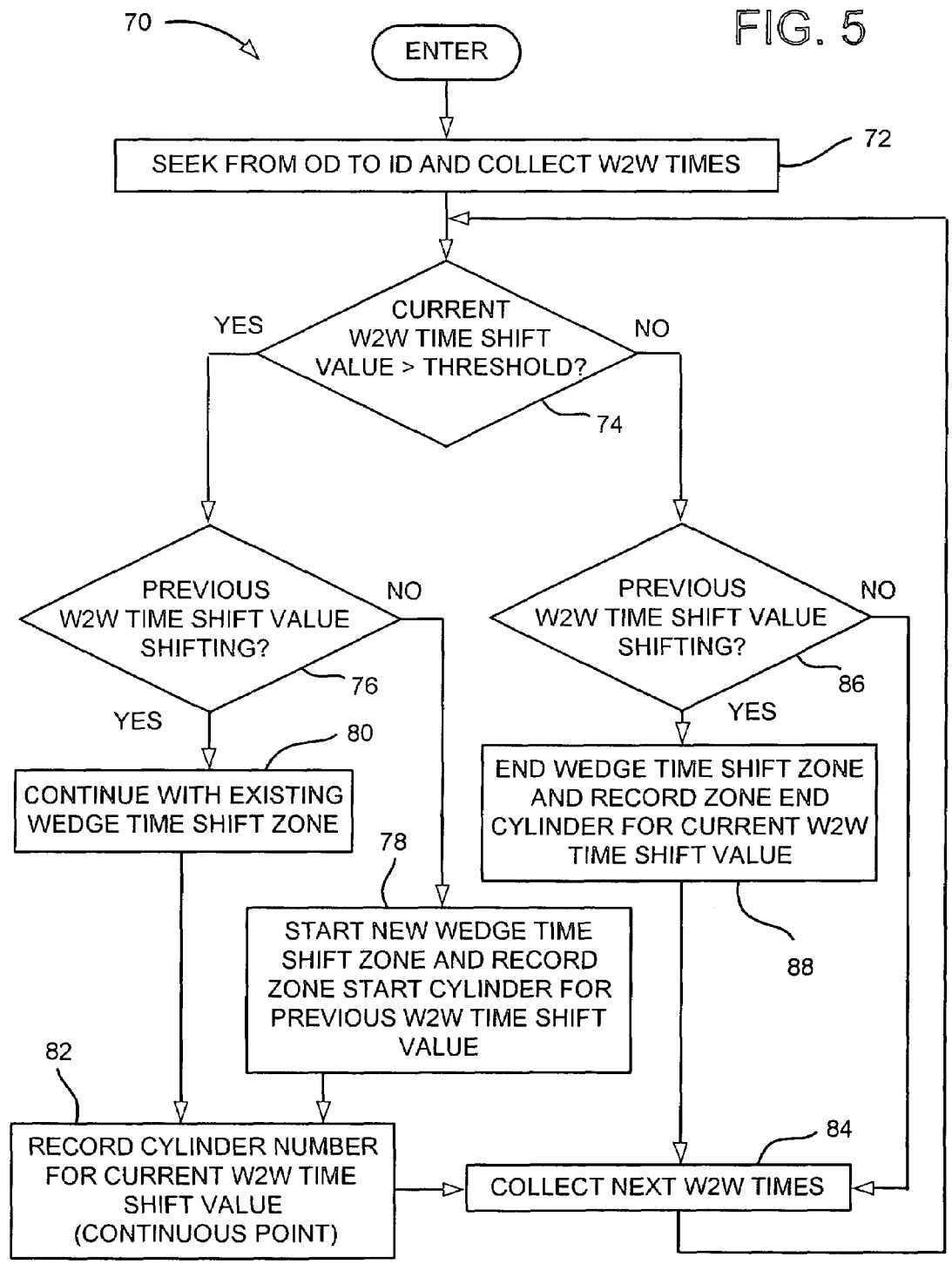
FIG. 5 is a flow diagram illustrating a method for identifying a wedge time shift zone, in accordance with the present invention.

FIG. 5 illustrates a technique 70 for identifying the wedge time shift zones 46. The disk 32 has about 200 servo wedges 42. The seek rate may be selected such that many servo wedges are encountered as the head traverses a track 44 or cylinder. The wedge-to-wedge W2W times t are collected during a seek from the disk's outer diameter OD to its inner diameter ID (block 72). Note that a seek from the disk's ID to its OD also may be effective. The W2W times may be collected from groups of cylinders based on the seek coast velocity. The collected W2W times for each cylinder group may be averaged resulting in a W2W time shift value. The W2W time shift value for a current cylinder group is compared against a threshold (block 74). If the W2W time shift value exceeds the threshold, then the extent of the corresponding wedge time shift zone is determined by checking whether the W2W time shift value for the previous cylinder group was shifting (block 76). If not, the current cylinder group corresponds to the start of a new wedge time shift zone (block 78) and is recorded as such. Otherwise, the current cylinder group is a continuation of an existing wedge time shift zone (block 80). The starting cylinder number for the group for the current W2W time shift value is recorded as a continuous point for the wedge time shift zone being identified (block 82), and the next cylinder group's W2W times are collected (block 84). If the W2W time shift value does not exceeds the threshold (block 74), then the end of a wedge time shift zone is determined by checking whether the W2W time shift value for the previous cylinder group was shifting (block 86). If yes, the cylinder number for the end of the current cylinder group is recorded as the end of the wedge time shift zone (block 88). Otherwise, the process continues to collect the next cylinder group's W2W times (block 84).

We claim:

1. A method for wedge time shift calibration in a disk drive, the disk drive comprising a disk, a head actuated over the disk, and a spindle motor for rotating the disk at an operating speed in response to a spindle control current generated by a spindle control system, the disk having a plurality of spaced-apart embedded servo wedges that define a plurality of concentric data tracks, the method comprising the steps of:
   (a) seeking across the disk and measuring wedge-to-wedge times between servo wedges;
   (b) calculating a wedge-to-wedge time shift value using the wedge-to-wedge times;
   (c) determining whether the wedge-to-wedge time shift time value exceeds a predetermined threshold;
   (d) if the wedge-to-wedge time shift value exceeds the predetermined threshold, then identifying a wedge time shift zone; and
   (e) storing information for compensating for the identified wedge time shift zone during disk operations.

2. A method for wedge time shift calibration as defined in claim 1, wherein the identified wedge time shift zone comprises a zone start cylinder and a zone end cylinder.

3. A method for wedge time shift calibration as defined in claim 2, wherein the step of storing information for compensating for the identified wedge time shift zone further comprises storing the wedge-to-wedge time shift value corresponding to the zone start cylinder and the wedge-to-wedge time shift value corresponding to the zone end cylinder in nonvolatile memory.

4. A method for wedge time shift calibration as defined in claim 1, further comprising continuing the seek from an outer diameter to an inner diameter of the disk and, for each identified wedge time shift zone, storing information for compensating for each identified wedge time shift zone during disk operations.

5. A method for wedge time shift calibration as defined in claim 1, further comprising continuing the seek from an inner diameter to an outer diameter of the disk and, for each identified wedge time shift zone, storing information for compensating for each identified wedge time shift zone during disk operations.

6. A disk drive, comprising:
   a magnetic disk having a plurality of spaced-apart embedded servo wedges that define a plurality of concentric data tracks;

a spindle motor for rotating the disk at an operating speed in response to a spindle control current generated by a spindle control system;

a head actuated over the disk;

a control system for:
  seeking across the disk and measuring wedge-to-wedge times between servo wedges;
  calculating a wedge-to-wedge time shift value using the wedge-to-wedge times;
  determining whether the wedge-to-wedge time shift time value exceeds a predetermined threshold;
  if the wedge-to-wedge time shift value exceeds the predetermined threshold, then identifying a wedge time shift zone; and
  storing information for compensating for the identified wedge time shift zone during disk operations.

7. A disk drive as defined in claim 6, wherein the identified wedge time shift zone comprises a zone start cylinder and a zone end cylinder.

8. A disk drive as defined in claim 7, wherein storing information for compensating for the identified wedge time shift zone further comprises storing the wedge-to-wedge time shift value corresponding to the zone start cylinder and the wedge-to-wedge time shift value corresponding to the zone end cylinder in nonvolatile memory.

9. A disk drive as defined in claim 6, wherein the control system is further for continuing the seek from an outer diameter to an inner diameter of the disk and, for each identified wedge time shift zone, storing information for compensating for each identified wedge time shift zone.

10. A disk drive as defined in claim 6, wherein the control system is further for continuing the seek from an inner diameter to an outer diameter of the disk, for each identified wedge time shift zone, storing information for compensating for each identified wedge time shift zone.

11. A magnetic disk of a disk drive, comprising:
  a plurality of spaced-apart embedded servo wedges that define a plurality of concentric data tracks;
  at least one wedge time shift zone; and
  stored information for compensating for a wedge time shift zone during disk operations wherein the stored information for compensating for a wedge time shift zone comprises a zone start cylinder and a zone end cylinder.

12. A magnetic disk as defined in claim 11, wherein the stored information for compensating for a wedge time shift zone further comprises a wedge-to-wedge time shift value corresponding to the zone start cylinder and a wedge-to-wedge time shift value corresponding to the zone end cylinder.

* * * * *